Patented Mar. 1, 1932

1,848,077

UNITED STATES PATENT OFFICE

WERDEN D. HUFFMAN, OF DETROIT, MICHIGAN, ASSIGNOR TO GENERAL MOTORS CORPORATION, OF DETROIT, MICHIGAN, A CORPORATION OF DELAWARE

INK

No Drawing. Application filed May 11, 1929. Serial No. 362,451.

The object of this invention is to produce an ink which will be suitable for use in recording instruments. Such an ink must have properties which the ordinary writing inks do not possess. It must be capable of being delivered from a pen uniformly, so that an unbroken, irregular line may be traced. It must not dry quickly enough to clog the pen, nor slowly enough to cause blots to appear on the surface on which the line is traced. It must have color of such degree and permanence as to insure the legibility and permanence of the line, and should be a clear and homogeneous solution of which the color will not change, and in which a precipitate will not form on indefinite standing.

I have discovered that by dissolving a water soluble organic pigment in water, adding to the solution a substance which will decrease the rate of evaporation of the solvent; and, then, adding to the mixture a water solution of a preservative which will prevent fermentation of the pigment, I can produce an ink which satisfactorily meets the requirements outlined above and is otherwise entirely satisfactory for the purpose mentioned. The preservative solution may contain, in addition to the preservative, a substance which will render the solution neutral, acidic, or alkaline, so as to prevent it decomposing precipitating or otherwise deteriorating the pigment.

A red ink, which is eminently satisfactory for the purpose mentioned, contains the following ingredients in the proportions specified:

| | |
|---|---|
| Eosin (water soluble) | ½–1½ oz., preferably 1 oz. |
| Water | 1 gal. |
| Formic acid | 1–5 cc., preferably 2 cc. |
| Ammonium hydroxide | About two drops in excess of the amount required to neutralize the formic acid. |
| Glycerol | 3–7 cc., preferably 5 cc. |

The ammonium hydroxide, which is specified in the formula given above, is used merely to neutralize the formic acid and prevent it converting the water soluble eosin into tetrabromo-fluorescein which is insoluble in water, and may be replaced by any suitable alkali or alkaline reacting substance. More or less incidentally, the slight excess of ammonium hydroxide which is used serves to deepen the color of the ink. When the preservative used does not have an acid reaction, it is, of course, unnecessary to use any alkali. When an alkali is used it should be added to the preservative solution before the latter is added to the pigment solution.

Although the ink described above is primarily designed for use in recording instruments, it is as satisfactory as, if not more satisfactory than, ordinary writing inks for use in writing pens.

I claim:

1. The ink formed by dissolving the following ingredients in water: water soluble eosin, formic acid, and an alkali.

2. The ink formed by dissolving the following ingredients in water: water soluble eosin, formic acid, and ammonia.

3. The ink formed by dissolving water soluble eosin, formic acid, ammonia, and glycerol, in water.

4. The ink which is obtained by mixing the following ingredients in the following proportions: 1–1½ oz. of water soluble eosin, 1 gal. of water, 1–5 cc. of formic acid, an amount of ammonium hydroxide slightly in excess to the amount necessary to neutralize the formic acid, and 3–7 cc. of glycerol.

5. The ink which is obtained by mixing the following ingredients in the following proportions: 1 oz. of water soluble eosin, 1 gal. of water, 2 cc. of formic acid, an amount of ammonium hydroxide slightly in excess of the amount required to neutralize the formic acid, and 5 cc. of glycerol.

6. The method of preparing an ink which consists of dissolving water soluble eosin in water, adding glycerol to the solution, dissolving formic acid in water, adding to the formic acid solution an amount of ammonium hydroxide slightly in excess of that necessary to neutralize the formic acid, and mixing the two solutions.

7. An ink which contains water soluble eosin as coloring matter, water as a solvent, formic acid as a preservative, an amount of ammonium hydroxide slightly in excess of that necessary to neutralize the acid, and glycerol.

In testimony whereof I affix my signature.

WERDEN D. HUFFMAN.